Dec. 15, 1970  O. W. MULLER  3,546,854
CENTRIFUGAL SEPARATOR
Filed Nov. 30, 1967  2 Sheets-Sheet 1

INVENTOR.
OKE W. MULLER
BY Bosworth, Sessions
Herrstrom & Cain
ATTORNEYS.

Dec. 15, 1970  O. W. MULLER  3,546,854
CENTRIFUGAL SEPARATOR

Filed Nov. 30, 1967  2 Sheets-Sheet 2

INVENTOR.
OKE W. MULLER
BY Bosworth, Sessions
Herrstrom + Cain
ATTORNEYS.

United States Patent Office 3,546,854
Patented Dec. 15, 1970

3,546,854
CENTRIFUGAL SEPARATOR
Oke W. Muller, 5000 Longmont No. 3,
Houston, Tex. 77006
Filed Nov. 30, 1967, Ser. No. 687,025
Int. Cl. B01d 45/12; B04c 3/00
U.S. Cl. 55—455
2 Claims

ABSTRACT OF THE DISCLOSURE

A centrifugal device for separating entrained solid or liquid particles from a gaseous stream. A stationary baffle or tuyere is mounted within a cylindrical casing to impart an angular velocity to a gaseous stream passing therethrough so that in response to centrifugal force, the entrained particles are collected in an annular envelope adjacent the casing wall and thence removed from the separator. The baffle or tuyere defines a frusto-conical surface with its tapering end extending upstream and its base located adjacent the casing wall. The tapering end of the baffle or tuyere is closed to confine the gaseous stream to tangential slots defined by the tuyere.

BACKGROUND OF THE INVENTION

This invention relates to centrifugal separators of the non-rotative type and especially to separators for purifying gaseous fluids such as air, steam, petroleum gas and vapors and the like by the removal therefrom of entrained solid and liquid particles. More particularly the invention relates to an improved tuyere to be mounted in the separator casing to impart an angular velocity to the gaseous stream.

A major problem encountered in centrifugally separating solid and liquid particles from gases and vapors is the vortex effect which may result due to the low-pressure zone that develops in the center or core of the whirling fluid mass. The stationary tuyere of the separator normally imparts an angular velocity to the gaseous stream passing therethrough so that each solid or fluid particle entrained therein tends to follow a helicoidal path of travel. The centrifugal force acting on the particles thus urges them tangentially outward through the lighter gases and toward the wall of the casing to collect in an annular envelope within the separation chamber.

The angularly velocity of the gaseous stream, however, causes a relatively high static pressure in the annular outer zone or envelope and a relatively low static pressure in the central or core zone. Consequently when any part of the high-pressure, annular envelope comes in close proximity to the low-pressure core, a vortex may develop and the separated solid or liquid particles will re-entrain in the low-pressure core.

This danger of a vortex developing is more pronounced where a conical tuyere is used rather than a barrel-type tuyere, because the high-pressure envelope actually merges with the low-pressure core at the apex end of the tuyere. Thus the system is quite vulnerable to vortex formation particularly when subjected to surges or overloading. A typical prior art conical type tuyere is shown in U.S. Pat. No. 2,565,902 while a typical barrel type tuyere is shown in U.S. Pats. Nos. 2,560,075, 2,709,501, 2,732,909 and 2,223,079. While the barrel type tuyere does not normally present a vortex formation problem, it does not provide the separation efficiency that a separator using a conical type tuyere does.

The centrifugal separator of the present invention, however, substantially reduces the problems indicated above and affords other features and advantages not obtainable from the prior art.

SUMMARY OF THE INVENTION

It is among the objects of the invention to reduce the possibility of vortex formation of the type described in a centrifugal separator for gaseous fluids under conditions of overloading or surges.

Another object is to provide a stationary baffle or tuyere for a centrifugal separator which accommodates a large volume of gaseous fluids with very high separation efficiency and which is generally not vulnerable to vortex formation.

These objects and others are accomplished by a centrifugal separator construction comprising a generally cylindrical casing having an inlet and an outlet for a gaseous stream and a baffle assembly or tuyere mounted in the casing. The tuyere has a generally frusto-conical surface with its tapering end extending toward the inlet and its base open and secured to the wall of the casing, the diameter of the tapered end being from about .3 to .6 the diameter of the base. The tuyere defines a plurality of spaced tangential slots adapted to impart an angular velocity to the gaseous stream, and the casing and tuyere together define a separation chamber wherein the entrained particles in response to centrifugal force are collected in an annular envelope while the relatively particle-free gaseous stream exits through the outlet. Means are provided in the casing for removing the collected solid or liquid particles from the separation chamber.

According to a modified form of the invention which is adapted to provide an increased capacity for the separator without loss in separation efficiency, the upstream end of the tuyere is provided with a cylindrical portion of approximately the same diameter as the tapering end thereof, the cylindrical portion also being provided with tangential slots adapted to impart an angular velocity to that portion of the gaseous stream which passes therethrough.

DESCRIPTION OF THE PREFERRED EMBODIMENT

Figure 1:
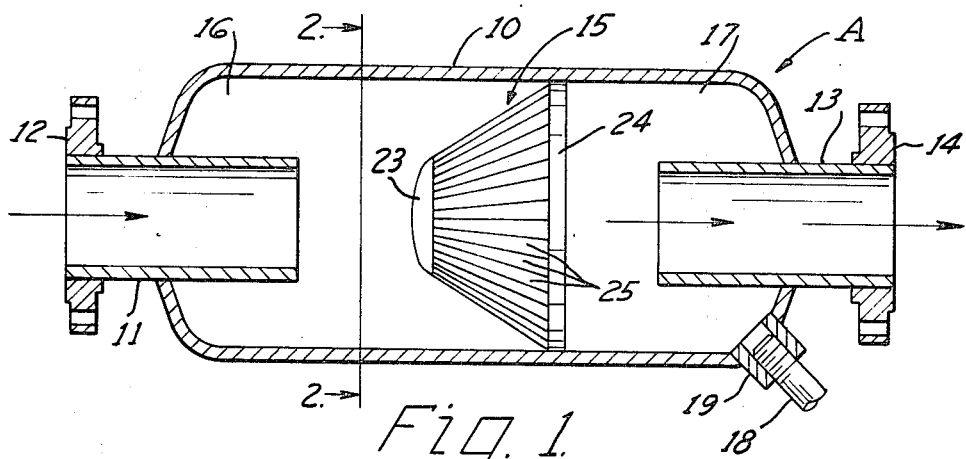
FIG. 1 is a longitudinal sectional view of a centrifugal separator embodying the invention.
Figure 3:
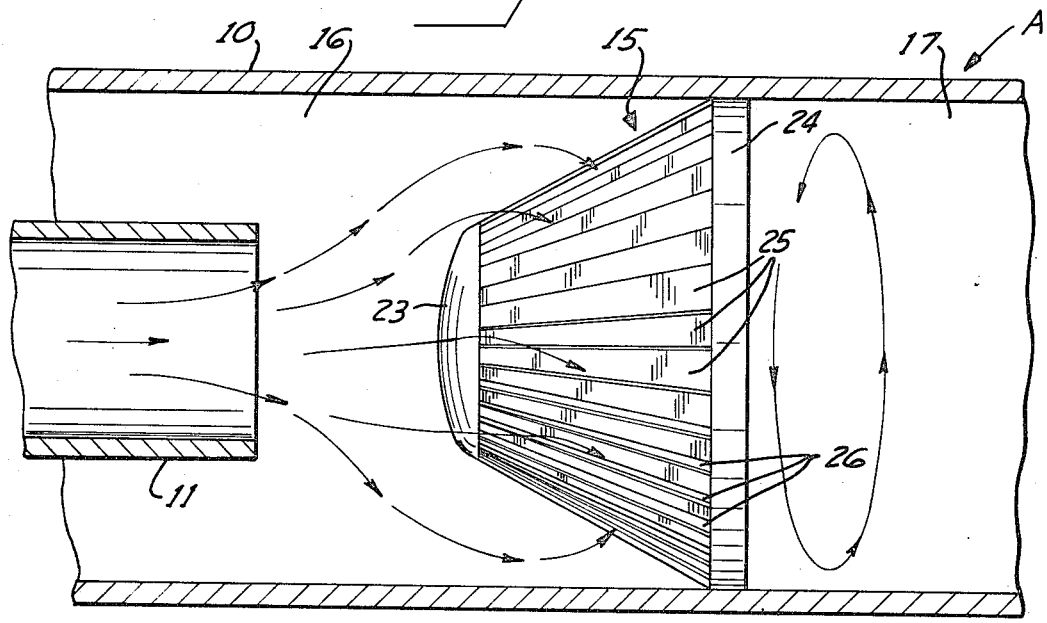
FIG. 3 is a fragmentary longitudinal sectional view drawn to the scale of FIG. 2 illustrating diagrammatically the passage of a gaseous fluid through the tuyere of the centrifugal separator of FIG. 1.
Figure 2:
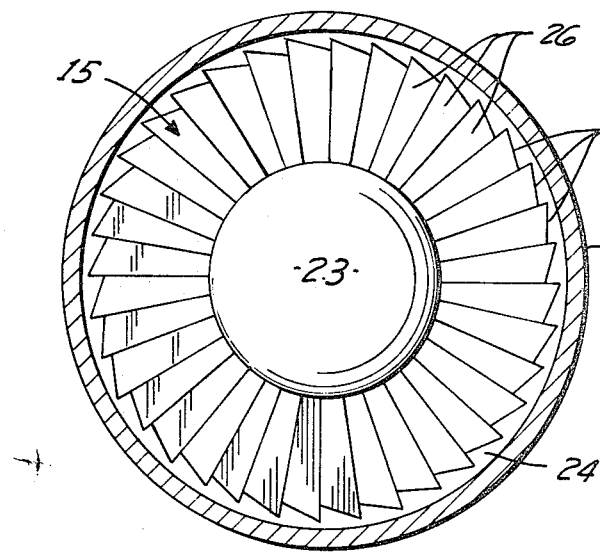
FIG. 2 is a transverse sectional view on an enlarged scale taken on the line 2—2 of FIG. 1.

Referring more particularly to the drawings, FIGS. 1 to 3, 5 and 6 show a non-rotative type centrifugal separator A embodying the invention and adapted for mounting in various types of conduit for gaseous fluids. The separator A comprises a cylindrical casing or shell 10 having an inlet pipe 11 extending through the left hand end as viewed in FIG. 1. The inlet pipe 11 has a coupling flange 12 at its upstream end which serves to connect the inlet end of the separator to the open end of the conduit. An outlet pipe 13 extends into the opposite end of the separator 10 and has a coupling flange 14 mounted at its downstream end for connecting the separator A to the opposite open end of the conduit. The inlet pipe 11 and outlet pipe 13 are axially aligned with one another and are preferably of the same diameter.

A whirling motion is imparted to the gaseous fluid passing through the separator A by means of a tuyere 15 located between the pipes 11 and 13, the tuyere being of right-circular frusto-conical form with its tapering end located upstream and extending toward the inlet pipe 11. The tuyere 15 divides the separator A into a forward chamber 16 at the upstream end and a separation chamber 17 at the downstream end. A drain pipe 18 received in a threaded sleeve 19 extending through the wall of the casing and into the separation chamber 17, permits removal of the solid or liquid material that is accumulated during the centrifugal separation.

A blunt nose piece 23 preferably having an aerodynamic form, closes the tapering end of the frusto-conical tuyere and forces the gaseous streams to pass through the slotted conical portion thereof. At the base of the tuyere is a mounting rim 24 by which the tuyere may be secured to the cylindrical wall of the casing 10, and which supports the downstream ends of tangential vanes 25 which extend between the nose piece 23 and the rim 24 and which define therebetween, tangential slots 26 through which the gaseous fluid must pass to reach the separation chamber 17. The tangential vanes 25 are so positioned that the slots 26 defined therebetween impart an angular velocity to the gaseous fluid as it passes therethrough.

Figure 5:
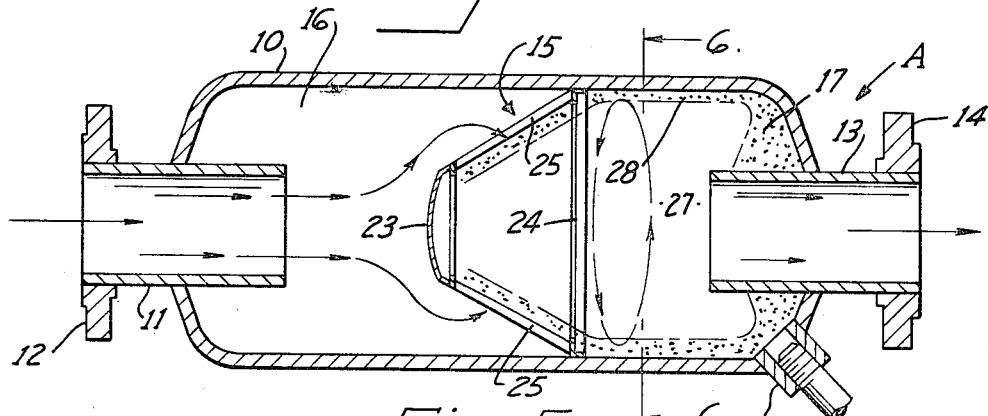
FIG. 5 is a longitudinal sectional view similar to FIG. 1 but showing the tuyere in cross section and illustrating the formation of the high pressure envelope containing the centrifugally separated particles.
Figure 6:
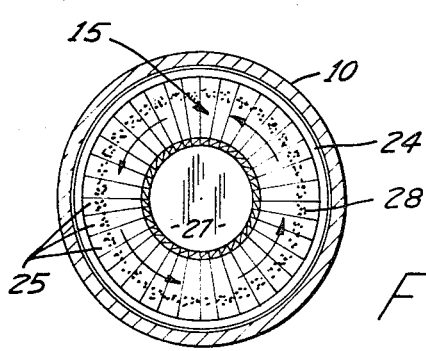
FIG. 6 is a transverse sectional view taken on the line 6—6 of FIG. 5.

Referring to FIGS. 5 and 6 it will be seen that the gaseous fluid in the separation chamber 17 is a whirling mass due to the angular velocity imparted by the tuyere 15. Due to the centrifugal force resulting from the angular velocity of the whirling mass, a low-pressure core 27 develops in the central part of the chamber and a high-pressure envelope 28 develops adjacent the casing wall. Due to the centrifugal force solid or liquid material in the whirling mass rapidly moves to the high-pressure envelope 28.

FIG. 5 illustrates that the high-pressure envelope 28 containing the separated solid or liquid particles begins to form just within the upstream end of the tuyere 15. Due to the frusto-conical shape of the tuyere, however, the envelope 28 also has an open ended frusto-conical form so that the particles at all times are spaced outwardly from the central low-pressure core 27 and the upstream end of the envelope 28 does not converge to the extent that it can merge with the low-pressure core and form a vortex.

Figure 4:
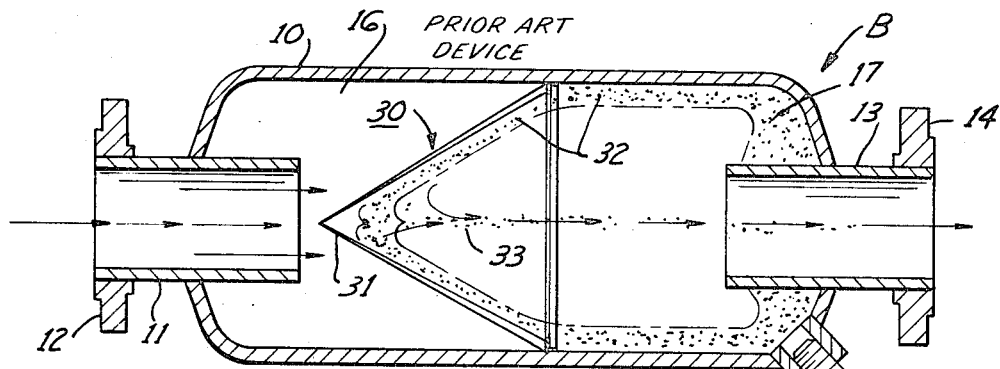
FIG. 4 is a longitudinal sectional view illustrating a prior art centrifugal separator of the type utilizing a conical tuyere.

In comparing the separator construction of FIG. 5 with the prior-art conical-tuyere type separator B of FIG. 4, it will be seen that the conical type tuyere 30 begins to impart a whirling motion to the fluid mass at the upstream apex end 31 thereof. Accordingly, the resulting high-pressure envelope 32 containing the separated particles extends into the low-pressure core. Due to the vortex effect it is possible for these particles under certain conditions to be drawn out of the envelope and into the central core as indicated by the numeral 33, thus defeating the purpose of the separator. This condition is particularly likely to occur during transient surges or overloading. Due to the frusto-conical form of the tuyere 15 of the present invention, however, the danger of the vortex effect is substantially eliminated and the separator A is able to accommodate transient surges and overloadings without severe consequences.

Figure 7:
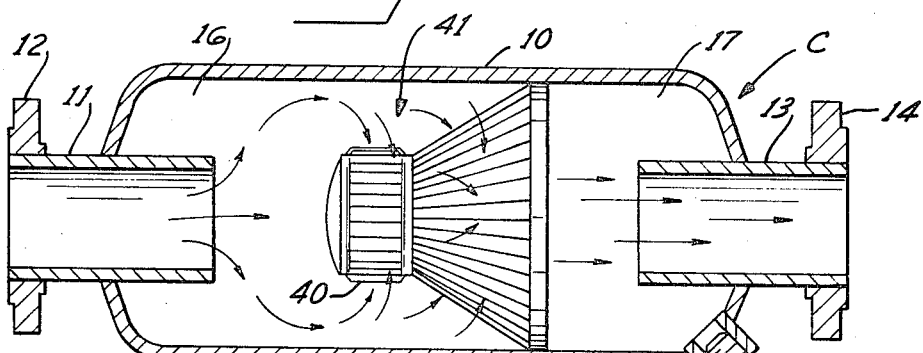
FIG. 7 is a longitudinal sectional view illustrating a modified form of the invention wherein the centrifugal separator is adapted to handle a greater volume of gaseous fluid.

FIG. 7 shows a modified form C of the centrifugal separator of the invention wherein a short cylindrical tuyere portion 40 is provided at the tapered end of the tuyere 41 so as to increase the volumetric capacity of the separator while still utilizing a separator casing 10 of the same diameter.

It has been found that in order to gain the advantages of the invention the ratio of the diameter of the tapered upstream end of the frusto-conical tuyere to the diameter of its downstream base should be from about .3 to about .6 and the cone angle should be oblique, preferably between about 45° and 85°. Within these structural ratios, the centrifugal separator is able to handle a high volumetric capacity per blade area with excellent separation of the undesirable solid or liquid particles from the gaseous stream.

While the invention has been illustrated and described with respect to specific embodiments thereof it will be understood that variations and modifications may be made in the form and arrangement of the several parts and elements thereof without departing from the spirit of the invention. The invention therefore is not to be limited to the particular structures and mechanisms herein shown and described nor in any manner inconsistent with the extent to which the progress in the art has been advanced by the invention.

What is claimed is:

1. Apparatus for separating entrained particles from a gaseous stream comprising: a generally cylindrical casing having an axial inlet and an axial outlet for said stream at opposite ends thereof, a tuyere coaxially mounted within said casing and having one portion with tangential vanes defining a frusto-conical surface with a tapering end extending upstream and an open base of substantially the same diameter as the inner diameter of said casing, the diameter of said tapering upstream end being from about .3 to .6 times the diameter of said base, said frusto-conical surface defining therewithin an empty frusto-conical space, and another portion with tangential vanes defining a cylindrical surface, said other portion extending upstream from the tapering end of said frusto-conical surface and said cylindrical surface having substantially the same diameter as said upstream end, said vanes of both of said portions defining a plurality of circumferentially spaced tangential slots adapted to impart an angular velocity to said gaseous stream, an imperforate nose piece secured to the upstream end of said cylindrical portion and coaxial therewith, said casing and said tuyere defining a downstream separation chamber wherein said entrained particles in response to centrifugal force are collected in an annular envelope radially spaced from the axis of said casing while said stream exits through said outlet, and means for removing said collected particles from said separation chamber.

2. Apparatus for separating entrained particles from a gaseous stream comprising: a casing having an inlet and an outlet for said stream, a tuyere mounted within said casing and having one portion with tangential vanes defining a frusto-coincal surface with a tapering end extending upstream and an open base, the diameter of said tapering upstream end being from about .3 to .6 times the diameter of said base, said frusto-conical surface defining therewithin an empty frusto-conical space and having a cone angle between from about 45° to about 85°, and another portion with tangential vanes defining a cylindrical surface, said other portion extending upstream from the tapering end of said frusto-conical surface and said cylindrical surface having substantially the same diameter as said upstream end, said vanes of both of said portions defining a plurality of circumferentially spaced tangential slots adapted to impart an angular velocity to said gaseous stream, an imperforate nose piece secured to the upstream end of said cylindrical portion and coaxial therewith, said casing and said tuyere defining a downstream separation chamber wherein said entrained particles in response to centrifugal force are collected in an annular envelope radially spaced from the axis of said tuyere while said stream exits through said outlet, and means for removing said collected particles from said separation chamber.

References Cited

UNITED STATES PATENTS

| | | | |
|---|---|---|---|
| 1,821,468 | 9/1931 | Hanley | 138—37X |
| 2,224,429 | 12/1940 | Fisher | 55—455X |
| 1,700,261 | 1/1929 | Hawley | 55—455X |
| 2,565,902 | 8/1951 | Wright et al. | 55—455X |
| 2,709,501 | 5/1955 | Toth et al. | 55—455X |
| 2,823,760 | 2/1958 | Andersen | 55—AGGUX |
| 2,894,600 | 7/1959 | Veres | 55—455X |

DENNIS E. TALBERT, JR., Primary Examiner

U.S. Cl. X.R.

55—457, 458; 210—512